US007809985B2

(12) United States Patent
Chen et al.

(10) Patent No.: US 7,809,985 B2
(45) Date of Patent: Oct. 5, 2010

(54) OFFLINE HARDWARE DIAGNOSTIC ENVIRONMENT

(75) Inventors: Kai Chen, Sammamish, WA (US); Melur Raghuraman, Sammamish, WA (US); Peter Wieland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 11/863,950

(22) Filed: Sep. 28, 2007

(65) Prior Publication Data

US 2009/0089616 A1 Apr. 2, 2009

(51) Int. Cl.
*G06F 11/00* (2006.01)

(52) U.S. Cl. ........................................ 714/25
(58) Field of Classification Search ................... 714/25
See application file for complete search history.

(56) References Cited

U.S. PATENT DOCUMENTS

| | | | | |
|---|---|---|---|---|
| 3,838,260 | A * | 9/1974 | Nelson | 714/25 |
| 5,327,550 | A | 7/1994 | Pribnow | |
| 5,396,619 | A * | 3/1995 | Walton | 714/8 |
| 5,398,333 | A * | 3/1995 | Schieve et al. | 714/36 |
| 5,602,990 | A | 2/1997 | Leete | |
| 5,740,183 | A * | 4/1998 | Lowe | 714/736 |
| 5,754,853 | A * | 5/1998 | Pearce | 713/2 |
| 6,018,808 | A * | 1/2000 | Schieve | 714/36 |
| 6,360,336 | B1 * | 3/2002 | Christensen et al. | 714/47 |
| 6,804,813 | B1 * | 10/2004 | Willems et al. | 717/125 |
| 7,036,129 | B1 | 4/2006 | Korhonen | |
| 2004/0153807 | A1 | 8/2004 | Watt et al. | |
| 2004/0163011 | A1 | 8/2004 | Shaw | |
| 2005/0229039 | A1 | 10/2005 | Anderson et al. | |
| 2005/0278147 | A1 * | 12/2005 | Morton et al. | 702/183 |
| 2006/0224545 | A1 | 10/2006 | Keith, Jr. | |
| 2009/0089616 | A1 * | 4/2009 | Chen et al. | 714/25 |

OTHER PUBLICATIONS

"Offline Diagnostics Environment Administrator's and User's Guide" http://docs.hp.com/en/10320/ode-guide.pdf.
"System Diagnostic Model White Paper" http://www.dmtf.org/standards/documents/CIM/DSP0138.pdf.

* cited by examiner

*Primary Examiner*—Emerson C Puente
(74) *Attorney, Agent, or Firm*—Wolf, Greenfield & Sacks, P.C.

(57) ABSTRACT

A computer configured to operate in diagnostic mode during which the operating system is suspended. During the diagnostic mode, tests can be performed on the computer system, including hardware, and the tests do not disrupt the operating system and are not disrupted by the operating system. When diagnostic mode is triggered, execution of the operating system is suspended. When the diagnostic tests are completed, the operating system may resume operation and test data may be made available within the operating system environment. Upon resuming, the state of the computer prior to entering diagnostic mode may be restored, preventing any changes made during diagnostic mode from interfering with operation of the operating system or application components.

20 Claims, 4 Drawing Sheets

OFFLINE HARDWARE DIAGNOSTIC ENVIRONMENT

BACKGROUND

Computer users or administrators frequently desire to perform diagnostic tests on their computers. These tests can identify faulty components that can be replaced to correct errors detected by a user. Alternatively, diagnostic tests can be used to identify components that have failed or are operating with degraded performance even before the user notices an error.

Many diagnostic tests are run in a "pre-boot environment," meaning that the tests run before an operating system is loaded and begins execution. By running tests in a "pre-boot environment," the tests can access computer hardware without restrictions that may be imposed on applications that access hardware through the operating system. Also, components that could be disrupted by diagnostic tests or could disrupt diagnostic tests are generally not present in the pre-boot environment.

In many operating systems, computer users can access the "pre-boot environment" by entering a command that interrupts the normal boot sequence of the computer. For example, holding down a function key while the computer is going through its boot sequence may cause the computer to stop the normal boot sequence before the operating system is loaded, allowing the computer to be accessed in the pre-boot environment. From this environment, diagnostic tests may be run.

The pre-boot environment generally provides relatively low level functions that allow test components to access computer hardware or firmware. However, the pre-boot environment provides only limited user interface and data processing capabilities.

SUMMARY OF INVENTION

To facilitate a greater range of diagnostic functions in an easy-to-use fashion, a computer may be adapted to enter a diagnostic mode during which its operating system is suspended. Within the diagnostic mode, tests may be performed and test data collected as a result of running these tests may be stored where it can be accessed after the operating system resumes execution. With this architecture, diagnostic applications running on the operating system may both initiate diagnostic tests and process the results, but the diagnostic tests are neither blocked by the operating system nor disrupt the operating system or application components that execute in the operating system environment.

The diagnostic applications running within the operating system allow a broad range of diagnostic functions to be controlled through flexible and easy-to-use user interfaces or automatically under program control. For example, a diagnostic application may allow a user to invoke diagnostic tests on specific components or the diagnostic application may run in a background mode to invoke diagnostic tests periodically or in accordance with a schedule. Further, these diagnostic applications can support a range of uses of the test data, including providing data to a user, maintaining records or reporting diagnostic data to a network administrator.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
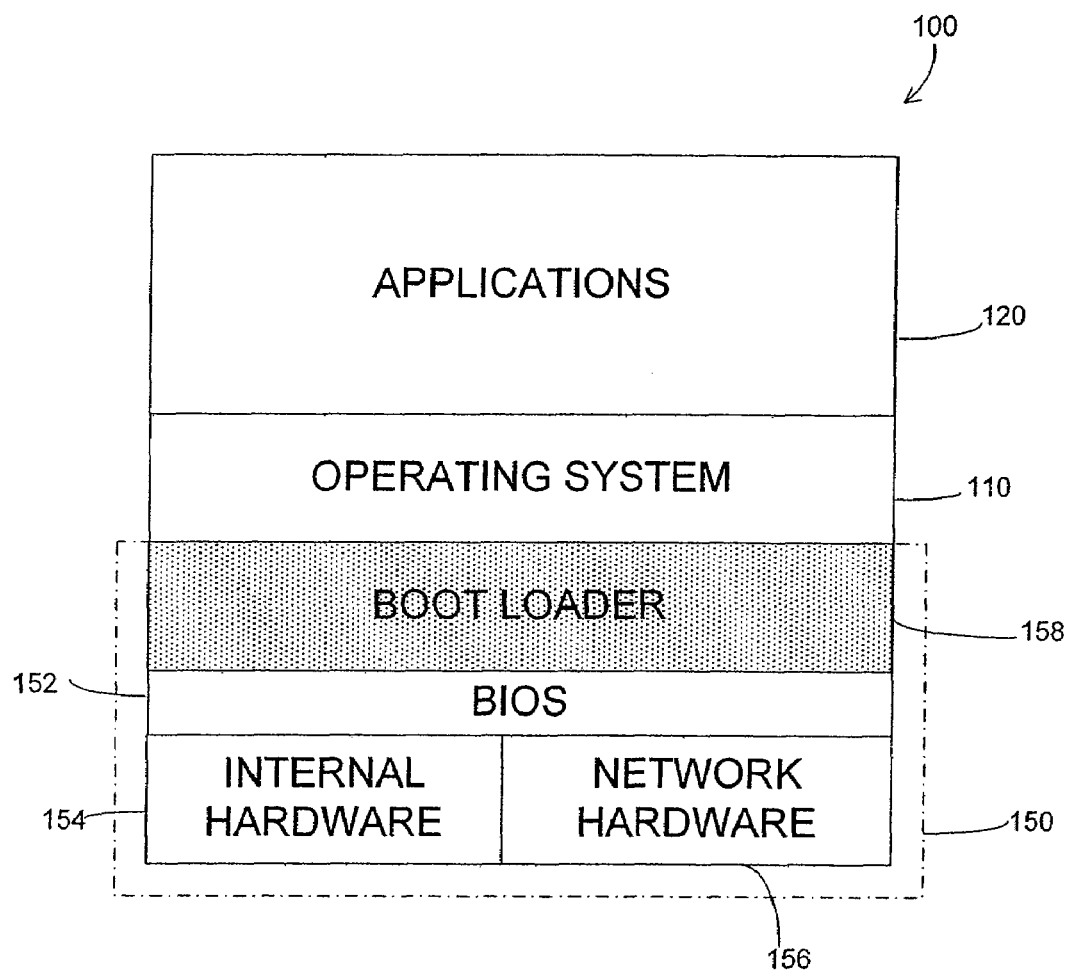
FIG. 1 is a simplified sketch of a prior art computer.

The inventors have appreciated drawbacks of current modes of executing diagnostic tests. One drawback is that running tests in a pre-boot environment can be a substantial disruption to normal use of the computer. If a computer is already running with its operating system loaded when a test is desired, re-booting the computer to create the pre-boot environment where tests can execute may be time consuming or otherwise undesirable. A further drawback is that invoking tests, collecting test results and using the test results in the pre-boot environment can be cumbersome and involve steps that typical computer users either do not know how to perform or are uncomfortable performing. Consequently, either the nature and frequency of tests that can be run may be limited or the experience for a user of the computer may be negative.

To enable a greater range of diagnostic functions, a computer may support entering a diagnostic mode in which diagnostic functions are executed with the computer operating system suspended. The diagnostic functions may be performed without interference from or interference to the operating system or application components. However, execution of tests is not limited to times at which the computer has been shutdown so that the pre-boot environment can be accessed. Further, diagnostic functions may be triggered by an application executing with the operating system. Such an application may enable user control over diagnostic functions through an easy-to-use interface, providing a good user experience. In addition, when the operating system resumes, the application may retrieve and analyze test data, providing a range of functions that further improves the user experience.

In embodiments of the invention, a framework that may already exist within an operating system for suspending the computer may be used to suspend the operating system for diagnostic functions. Computers may include such a framework to allow a computer to be suspended for power savings, for example. As part of suspending the computer, such a framework may store state information relating to hardware components, the operating system, application components or other aspects of computer operation. When computer operation resumes, that framework may load the stored state information so that the computer may continue execution from its prior state.

Suspending the operating system and later returning the computer to its state at the time the operating system was suspended may be faster and less disruptive than shutting down and re-booting the computer. Moreover, because the operating state is restored after diagnostic testing, any changes to the hardware made by the diagnostic tests do not impact operation of components within the operating system environment.

Once the operating system is suspended, diagnostic components may execute in an operating system-absent environment. This environment may be similar to the pre-boot environment and, for example, may be created with a Basic Input/

Output System (BIOS). The diagnostic components can then perform test functions that either would disrupt the operating system or be disrupted if the operating system were executing.

To enable results of tests to be analyzed or displayed in a convenient fashion, diagnostic components may store test results in a location that can be accessed by a diagnostic application running in the operating system environment. Following execution of any desired tests, the operating system may resume and the diagnostic application may be launched within the operating system environment. The diagnostic application can then obtain test data, perform analysis and display diagnostic results.

According to embodiments of the invention, diagnostic functions may be performed on any suitable type of computer. FIG. 1 illustrates a computer 100 as an example of a computer on which diagnostic functions may be performed. Computer 100 may have software and hardware components as are known in the art.

Computer 100 includes internal hardware 154. The specific type of internal hardware within computer 100 is not a limitation on the invention. However, computer 100 may contain volatile memory, such as SDRAM, and non-volatile memory, such as NVRAM or a disk drive. In addition, computer 100 may include a system bus that interconnects devices installed within computer 100 and may have a bus controller to control communications between those devices over the system bus. As another example, computer 100 may include multiple serial interfaces, such as USB interfaces, for communicating with peripheral devices.

Basic control functions for internal hardware 154 may be provided by a basic input/output system (BIOS) 152. BIOS 152 may be implemented as computer executable instructions stored in non-volatile memory within computer 100. Though, in some embodiments, a BIOS may have components implemented as firmware that, when executed, load other computer-executable instructions from a disk drive or other high volume non-volatile memory into faster, though volatile, memory. Accordingly, the specific form of BIOS 152 is not critical to the invention.

In some embodiments, computer 100 may be coupled to a network. A network could provide computer 100 with access to services such as printers and storage devices. BIOS 152 may also provide basic control functions to enable communication with network hardware 156. For example, BIOS 152 may perform basic functions controlling interactions with the network hardware 156, such as reading data from the network hardware 156 or writing data to the network hardware 156.

In general, the functions supported by BIOS 152 are low level functions, such as providing elemental read and write operations. More complex functions are generally provided by operating system 110. Operating system 110 may interact with the internal hardware 154 and network hardware 156 through BIOS 152. To provide more complex functions, operating system 110 may invoke multiple functions of BIOS 152 to perform one function that the operating system 110 supports. Because operating system 110 supports higher level functions, applications 120 that interact with the underlying internal hardware 154 or network hardware 156 through operating system 110 may provide a richer user experience than those executing in a pre-boot environment. Applications 120 may be any suitable computer applications, whether now known or hereafter developed. Such applications may include word processing programs, spreadsheet programs, web browsers and other applications.

Operating system 110, like BIOS 152, may be implemented as computer-executable instructions stored in memory within computer 100. However, because of the range of functions stored in operating system 110, those computer-executable instructions are generally stored in a high volume memory, such as a hard disk. Such memories, though enabling storage of large amounts of information, support limited access. Access to such high volume memories may either be too slow or sequential, which would preclude operating system 110 from executing from the high volume memory. Rather, when computer 100 is turned on, all or portions of operating system 110 may be transferred from the high volume storage into RAM from which the operating system 110 may execute Additionally, to prepare operating system 110 for execution, an appropriate initial operating sate for computer 100 may be established. Establishing the state may include changing configuration settings of hardware components, defining memory structures or other operations. This state may change as operating system 110 and applications 120 execute.

Operating system 110 may be loaded in any suitable way. For example, boot loader 158 may load operating system 110 into RAM so that it may begin execution. Boot loader 158 may utilize the low level functions of BIOS 152 to load operating system 110. FIG. 1 reveals a boot sequence that may occur when a computer initially begins to operate.

Hardware components, whether internal hardware 154 or network hardware 156, are present in computer 100 at the outset of the boot sequence. Computer 100 is configured such that when the computer is turned on, a processor within the computer begins executing instructions within BIOS 152. Typically, these instructions are stored in a defined memory location from which the processor within computer 100 begins executing instructions upon power up. However, any suitable mechanism for initiating execution of BIOS 152 may be used.

Those instructions within BIOS 152 may initiate operation of boot loader 158. Boot loader 158 may be initiated in any suitable way. As one example, instructions within BIOS 152 may copy computer instructions implementing boot loader 158 from disk or other non-volatile memory into RAM within computer 100. Once boot loader 158 is installed, boot loader may begin the process of copying all or portions of operating system 110 into RAM. Once the transfer is completed, boot loader 158 may cause a processor within internal hardware 154 to begin executing computer-executable instructions loaded as part of operating system 110.

Once operating system 110 begins executing, one or more applications 120 may be invoked. Computer-executable instructions performing operations within the applications 120 may be copied from a high volume storage device, either within internal hardware 154 or network hardware 156, into RAM within computer 110 where those instructions may be executed by a processor within internal hardware 154. Memory structures or other state-dependent elements may be created for the application.

Thereafter, application 120 may execute in an environment established by operating system 110. For example, an application may read or write data to a file that is physically stored within internal hardware 154 or network hardware 156. However, application 120 does not interface directly with the hardware components. Rather, application may 120 invoke functions provided by operating system 110 to read or write information to a file. Operating system 110 may translate the file operations requested by application 120 into lower level functions that can be performed by BIOS 152 to perform elemental operations on internal hardware 154 or network hardware 156.

Prior to loading of operating system 110, computer 100 has a pre-boot environment 150. As shown, the pre-boot environment 150 may include internal hardware 154 and network hardware 156 and BIOS 152. Once operating system 110 is loaded, boot loader 158 may no longer be needed. Accordingly, boot loader 158 may be deleted from RAM once operating system 110 is loaded and may not necessarily be present in a pre-boot environment 150.

In pre-boot environment 150, computer software that operates using only functions supported by BIOS 152 may execute. However, programs providing more complex functionality that rely on functions provided by operating system 110 cannot run. Because writing complex applications using only functions supported by BIOS 152 would be complex and time consuming, modules that execute in pre-boot environment 150 tend to provide limited functionality.

Some functions, including diagnostic tests, are generally performed in pre-boot environment 150. Diagnostic tests for hardware generally require low level control over the hardware components being tested. Accordingly, software components for performing tests on hardware components may require direct access to the hardware through BIOS 152. Further, testing may sometimes alter the state of the hardware components being tested. If the state of the hardware changes, operation of the operating system 110 or an application running in the operating system environment could be disrupted. For example, a test of memory could change the data stored in that memory. If that data is being used by operating system 110, the functioning of operating system 110 may be disrupted. Accordingly, hardware diagnostic tests have been conventionally executed in a pre-boot environment 150 or other operating system-absent environment.

However, diagnostic tests executed only in pre-boot environment 150 provide a user interface that may be difficult to use or otherwise limited. For example, to access diagnostic tests a user may have to shut down the computer and restart it. While restarting the computer, the user may have to enter a sequence of key strokes to stop boot loader 158 from loading operating system 110. Additionally, limiting the functions available to a diagnostic program to only those supported by BIOS 152 makes it difficult to create user interfaces for such diagnostic programs. Similarly, limiting analysis of test results to only analysis that can be supported using functions supported by BIOS 152 also limits the functionality that can be supported by such diagnostic programs.

To avoid the drawbacks of limiting execution of diagnostic functions to a pre-boot environment, a computer may be operated in a manner in which it may more readily switch between an operating system environment and a diagnostic environment.

Figure 2:
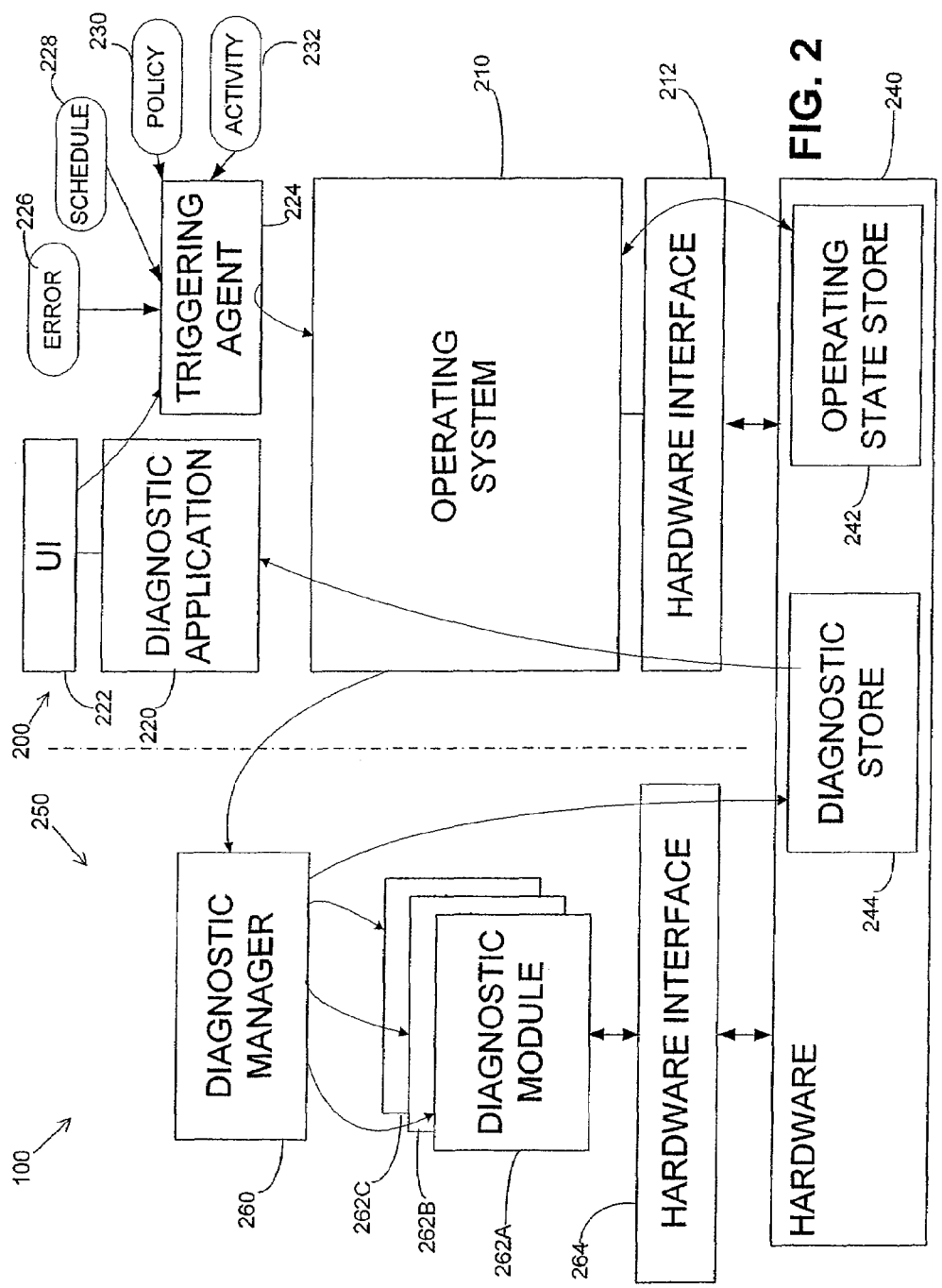
FIG. 2 is a sketch illustrating operation of a computer in an operating system environment and an operating system-absent environment, according to embodiments of the invention.

FIG. 2 illustrates a computer according to an embodiment of the invention in which a diagnostic mode may be entered without having to reboot computer 110. As a result, diagnostic tests may be initiated by application programs. Likewise, the computer can return to an operating system environment without re-booting the computer, allowing the results of diagnostic tests to be analyzed and used by application programs.

FIG. 2 illustrates an operating system environment 200 and a diagnostic environment 250. In the embodiment illustrated, computer 100 may operate in either a diagnostic mode using diagnostic environment 250 or may operate in operating system environment 200. Computer 100 may transition between operating system environment 200 and diagnostic environment 250 without rebooting the computer. In the embodiment illustrated, operating system 210 may be suspended in a fashion that allows a transition to diagnostic environment 250 and then a return to operating system environment 200. In this way, applications executing within operating system 210 may determine the nature and time of diagnostic functions to be performed. Those functions may be performed in diagnostic environment 250. Thereafter, test data collected within diagnostic environment 250 may be analyzed by applications in the operating system environment 200. In this way, low level control over the hardware is available for diagnostic testing without interference to an operating system or application, but high level functions supported by an operating system are available to control the nature and timing of those tests and analysis of data obtained by those tests.

Any suitable mechanism may be used to transition between the operating system environment 200 and diagnostic environment 250. However, in the embodiment illustrated, the transition is made using mechanisms incorporated in operating system 210 to support a "sleep" or "suspend" function. For example, a suspend function may be implemented by storing state information relating to operation of computer 100. This state information represents configuration information for hardware components information maintained by operating system 210 or application or other information that may be necessary to resume operating. As shown, operating state may be stored in an operating state store 242 in memory within computer hardware 240, such as a disk or other non-volatile memory within hardware 240. However, any suitable storage may be used for operating state information, including storage outside of computer 100.

In a suspend sequence as is known in the art, system 210 stores state information and then suspends the processor within hardware 240. In embodiments of the invention, the same operations may be used to store operating system state. However, rather than suspending operation of the computer processor, operating system 210 may transfer control to a diagnostics manager component 260. Diagnostic manager component 260 may be any suitable software component configured to execute within diagnostic environment 250.

In this example, diagnostic manager 260 may interface with computer hardware 240 through a hardware interface 264. Any suitable hardware interface 264 may be used. For example, hardware interface 264 may be a BIOS that is the same as or similar to a BIOS that may exist in a pre-boot environment. Consequently, diagnostic manager 260 may be a relatively simple component. For example, in some embodiments, diagnostic manager 260 may provide no user interface or may provide only a simple user interface, indicating that computer 100 is in diagnostic mode.

When invoked, diagnostic manager 260 may in turn invoke one or more diagnostic modules, such as diagnostic modules 262A ... 262C. Each diagnostic module may perform one or more tests. In the embodiment illustrated, each of the diagnostic modules performs a test on a component within hardware 240. Each of the diagnostic modules 262A ... 262C may access hardware 240 through hardware interface 264, which may allow elemental control over hardware components. In embodiments in which hardware interface 264 is a BIOS as would exist in a pre-boot environment, diagnostic modules 262A ... 262C may be implemented in the same fashion as diagnostic modules performing tests in a pre-boot environment as known in the art. However, any suitable implementation may be used for diagnostic modules 262A ... 262C.

In the embodiment illustrated, each of the diagnostic modules 262A ... 262C, after execution, returns test data to diagnostic manager 260. Diagnostic manager 260 stores the test data so that it can be accessed by components executing in operating system environment 200. In this way, a diagnostic application 220 executing in operating system environment 200 may use the test data to diagnose problems with hardware 240 or perform other diagnostic functions.

In embodiments in which a computer transitions from operating system environment 200 to diagnostic environment 250 using mechanisms as are known in the art for suspending operation of a computer, operation of diagnostic manager 260 and any other components within diagnostic environment 250 preferably do not disrupt the suspend and resume processes. For example, a suspend and resume process may entail verifying that the stored operating state information did not change while the operating system 210 was suspended. Accordingly, diagnostic manager 260 may store test results in a diagnostic store 244 that is separate from memory used to for operating state store 242. For example, diagnostics store 244 may be stored in non-volatile memory on a motherboard of computer 100 that is incorporated by the computer manufacturer specifically to contain diagnostic store 244 or non-volatile memory that is not used by operating system 210. In this fashion, the memory used for diagnostics store 244 will not overlap with the memory used for operating state store 242 so that writing information into diagnostic stored 244 does not interfere with operating state information in operating state store 242.

Alternatively, diagnostic store 244 and operating state store 242 may be kept separate by a memory manager within operating system 210 that assigns memory locations for operating state store 242. Such a memory manager could ensure that memory allocated for operating state store 242 does not overlap with memory used by diagnostics manager 260 for diagnostics store 244. Conversely, a memory manager within operating system 210 may assign memory for diagnostic store 244 that does not overlap with memory containing operating state store 242. In such an embodiment, upon suspending and transferring control to diagnostic manager 260, operating system 210 could communicate to diagnostic manager 260 the assigned location for diagnostic store 244. However, any suitable mechanism may be used to ensure that storing diagnostic information does not interfere with any stored information that operating system 210 will use for resuming operation.

Any information used in resuming operation of computer 100 in operating system environment 200 may be stored in operating state store 242. The specific state information stored is not critical to the invention. In some embodiments, the information stored may be the same as information stored as part of a suspend operation as is known in the art. Such information may include hardware status information for each device within computer 100. Operating system 210 may obtain such information through driver software associated with the devices. Such drivers may be coded to provide such state information as is known in the art. Additionally, operating state information may include state information maintained within operating system 210 or relating to any executing applications at the time computer 100 suspends operation.

FIG. 2 illustrates a process by which diagnostic functions may be performed in an easy-to-use fashion. Computer 100 may initially be operating within operating system environment 200. In that environment, operating system 210 accesses hardware 240 through a hardware interface 212. These interactions may be as are known in the art. For example, hardware interface 212 may be implemented by a BIOS, such as BIOS 152 (FIG. 1). However, any suitable hardware interface may be used though, in some embodiments, the functions of hardware interface 212 may be incorporated within operating system 210 and no separate hardware interface may be present.

Regardless of how operating system 210 interfaces to the underlying hardware 240, operating system 210 may provide relatively high level functionality to support applications that can execute in operating system environment 200. In addition to known computer applications, one application component executing in operating system environment 200 may be triggering agent 224. Triggering agent 224 may trigger operating system 210 to suspend its operation and transfer control to diagnostic manager 260 in diagnostic environment 250. Triggering agent 224 may obtain one or more inputs, allowing triggering agent 224 to identify a desired time for transitioning to a diagnostic mode. For example, triggering agent 224 may receive as an input error indicators 226. Computer 100 may be configured such that components within hardware 240, software components with operating system 210 or other application components may generate an interrupt or otherwise signal an error if they encounter an unexpected operating state that could be the result of a hardware error. Regardless of the form in which such operating errors are indicated, triggering agent 224 could receive such indications and initiate diagnostic mode in response.

Additionally, triggering agent 224 could be configured to periodically perform certain diagnostic tests or to perform tests according to a schedule. Accordingly, triggering agent 224 may receive schedule input 228 indicating the times at which one or more diagnostic functions is to be performed. For example, schedule input 228 may indicate that all available diagnostic functions be executed once a day. Alternatively, schedule input 228 may indicate that some diagnostic functions be performed more frequently than others. However, any suitable schedule may be specified.

As an additional input, triggering agent 224 may receive policy information 230. Policy information 230 may be provided by an administrator of a network to which computer network 100 is attached and may specify diagnostic functions desired by the administrator. Techniques for providing policy information to domain joined computers are known in the art and such techniques may be used in computer 100 if computer 100 is domain joined. However, any suitable mechanism may be used to provide policy information, including having a user input policy information defining diagnostics to run and when to run those diagnostics. For example, the policy could define diagnostics to be performed in response to an event, at a specific time or could be arbitrary, specifying that diagnostics should be performed at an arbitrary time.

Further, triggering agent 224 may receive activity level information 232. Such information may be generated by operating system 210 or obtained in any suitable way. Activity level information may indicate to triggering agent 224 a level of user interaction with computer 100. Triggering agent 224 may use activity level information to initiate diagnostic tests during periods of low activity so as to reduce disruption to a user of computer 100.

Additionally, triggering agent 224 may receive user input directly indicating that one or more diagnostic functions should be performed. In the embodiment illustrated, triggering agent 224 receives an input from a user through a user interface 222 provided by diagnostic application 220. The information input through user interface 222 may be in any suitable form and, for example, may identify specific diagnostic functions to execute The foregoing provide examples of inputs that triggering agent 224 may receive to identify the time at which a diagnostic function is to be performed. However, the invention is not limited to the specific examples given above, and any suitable inputs may be provided to allow triggering agent 224 to identify an appropriate time for execution of one or more diagnostic functions. Further, though the inputs were described separately, triggering agent 224 may use combinations of those inputs to determine the appropriate time for execution of a diagnostic function. For example, schedule input 228 may be used in conjunction with activity level 232 to determine a time for execution of a test function that is during a period of low activity and that is at least a predetermined interval following a prior execution of a test function.

Regardless of the specific mechanism by which triggering agent 224 identifies the time at which diagnostic functions are to be performed, when triggering agent 224 identifies such a time, it signals operating system 210 to enter a suspended operating mode. Operating system 210 then collects operating state information from hardware components and applications and from its internally maintained operating state information. This collection of information is written to operating state store 242. Operating system 210 then suspends its execution and transfers control to diagnostic manager 260.

In transferring control to diagnostic manager 260, operating system 210 may provide parameters that diagnostic manager 260 may use to perform diagnostic functions. Any suitable parameters may be used and any suitable mechanism may be used for passing those parameters. For example, in embodiments in which diagnostic store 244 is used to pass information from diagnostic manager 260 to applications within operating system environment 200, that diagnostic store can also be used to pass parameters to diagnostic manager 260. For example, those parameters may indicate specific diagnostic tests to be performed. In embodiments in which one of the parameters passed to diagnostic manager is the location of diagnostic store 244, another mechanism may be used to pass that information. For example, the location of diagnostic store 244 may be passed to diagnostic manager 260 by storing location information in a defined register or memory location within hardware 240. However, the specific mechanism by which parameters are passed between operating system environment 200 and diagnostic environment 250 is not critical to the invention and any suitable mechanism may be used.

Regardless of the specific mechanism used to transfer parameters to diagnostic manager 260, when operating system 210 had completed the process of storing operating state and providing parameters to initialize diagnostic manager 260, operating system 210 may transfer control to diagnostic manager 260. The transfer of control may occur in any suitable way. As one example, operating system 210 may cause the processor within hardware 240 to begin executing instructions from a memory location containing the first executable instruction in computer-executable code defining diagnostic manager 260.

Regardless of how execution of diagnostic manager 260 is initiated, diagnostic manager 260 thereafter may control the execution of one or more diagnostic functions. As illustrated in FIG. 2, diagnostic functions may be encoded in diagnostic modules 262A ... 262C. Diagnostic manager 260 may invoke any suitable number of diagnostic modules in any suitable order. Regardless of the number and type of diagnostics modules present in diagnostic environment 250, as each diagnostic module is invoked, the diagnostic module may perform tests on components within hardware 240. In the specific embodiment illustrated, diagnostic modules 262A ... 262C may each correspond to a single hardware component. Each diagnostic module, for example, could be supplied by a vendor supplying the hardware component. However, any suitable diagnostic module from any suitable source may be executed. In the embodiment illustrated, the diagnostic modules access hardware components through a hardware interface 264. Hardware interface 264 may be the same low level hardware interface 212 that exists in the operating system environment 200. As an example, hardware interface 262 may be a BIOS such as BIOS 152 (FIG. 1). However, because each diagnostic module 262A ... 262C is closely associated with one or more hardware components, it is not necessary that the diagnostic modules access components within hardware 240 through a hardware interface 264. Accordingly, the specific mechanism by which diagnostic modules access hardware components is not critical to the invention.

FIG. 2 shows three diagnostic modules 262A ... 262C. Three modules are shown for illustration, but any suitable number of diagnostic modules may be invoked in diagnostic environment 250. For example, different types of memory within hardware 240 may have different diagnostic modules associated with them. For example, RAM and NVRAM may each have separate diagnostic modules associated with them. Likewise, each hard disk, CD drive, DVD drive and serial port controller may have a diagnostic module associated with it. Accordingly, the number and type of diagnostic modules is not critical to the invention.

Each diagnostic module may execute a sequence of instructions to exercise its corresponding hardware component and determine the operating state of that component. Each diagnostic module will generate test data which may indicate whether the corresponding hardware component is operating properly. However, other forms of test data may alternatively or additionally be generated. For example, test data gathered by a diagnostic module may indicate the speed of operation of a hardware component or a number of faulty sectors found within a memory. Accordingly, further processing of the test data may be desired for making a diagnosis on the state of hardware 240 and analysis of the test data may reveal diagnostic results other than that a component is properly operating or faulty.

In the embodiment illustrated in FIG. 2, diagnostic application 220 executing in operating system environment 200 may perform such further analysis on the test data. Though, other application components may also analyze test data. Accordingly, a mechanism is provided to transfer test data generated by the diagnostic modules 262A ... 262C in the diagnostic environment 250 to components that can execute in the operating system environment 200 when that environment is resumed. In the embodiment illustrated in FIG. 2, each diagnostic module 262A ... 262C returns test data to diagnostic manager 260. Diagnostic manager 260 stores the test data in diagnostic store 244. In storing the test data, diagnostic manager 260 may format the data in any suitable fashion that allows an application in operating system environment 200 to associate the test data with specific diagnostic functions performed in diagnostic mode.

When diagnostic manager 260 completes execution of all required diagnostic functions, diagnostic manager 260 can trigger operating system 210 to resume operation. In this way, control will transfer back to operating system 210 after operating system environment 200 is recreated. Any suitable mechanism may be used for diagnostic manager 260 to return control to operating system 210. However, in the described embodiment in which operating system 210 enters a suspended state as is known in the art, diagnostic manager 260 may return control to operating system 210 by initiating a resume operation as is also known in the art. For example, according to a known resume process, operating system 210 may retrieve operating state information from operating state store 242. State information may be returned to the components that generated it. For example, information indicating the state of hardware components at the time that operating system 210 suspended may be returned to software drivers for those hardware components, allowing the software drivers to reconfigure the hardware to recreate the state was in at the time operating system 210 was suspended. Likewise, state information collected from applications or from within the operating system 210 may be returned to those components and used to restore the state of those components to their states at the time at which operating system 210 was suspended.

Once operating system environment 200 is recreated, execution of operating system 210 may resume. Likewise, applications executing within operating system environment 200 may also resume execution. Once executing, operating system 210 or any application executing in operating system environment 200 may access test data by reading that data from diagnostic store 244.

In the embodiment illustrated, the test data in diagnostic store 244 is retrieved by diagnostic application 220 after execution of operating system 210 resumes. Diagnostic application 220 may then process the test data. Any suitable processing of the test data may be performed. For example, processing within diagnostic application 220 may generate information concerning the functionality of hardware 240 that is displayed to a user through user interface 222. However, any other suitable processing may be performed.

As illustrated in FIG. 2, a computer 100 according to embodiments of the invention may transition between an operating system environment and a diagnostic environment. In making this transition neither the operating system nor the applications executing in the operating system environment are disrupted. However, diagnostic control information may be generated within an application component in the operating system environment and passed to the diagnostic environment, allowing for flexible control over diagnostic functions.

Figure 3A:
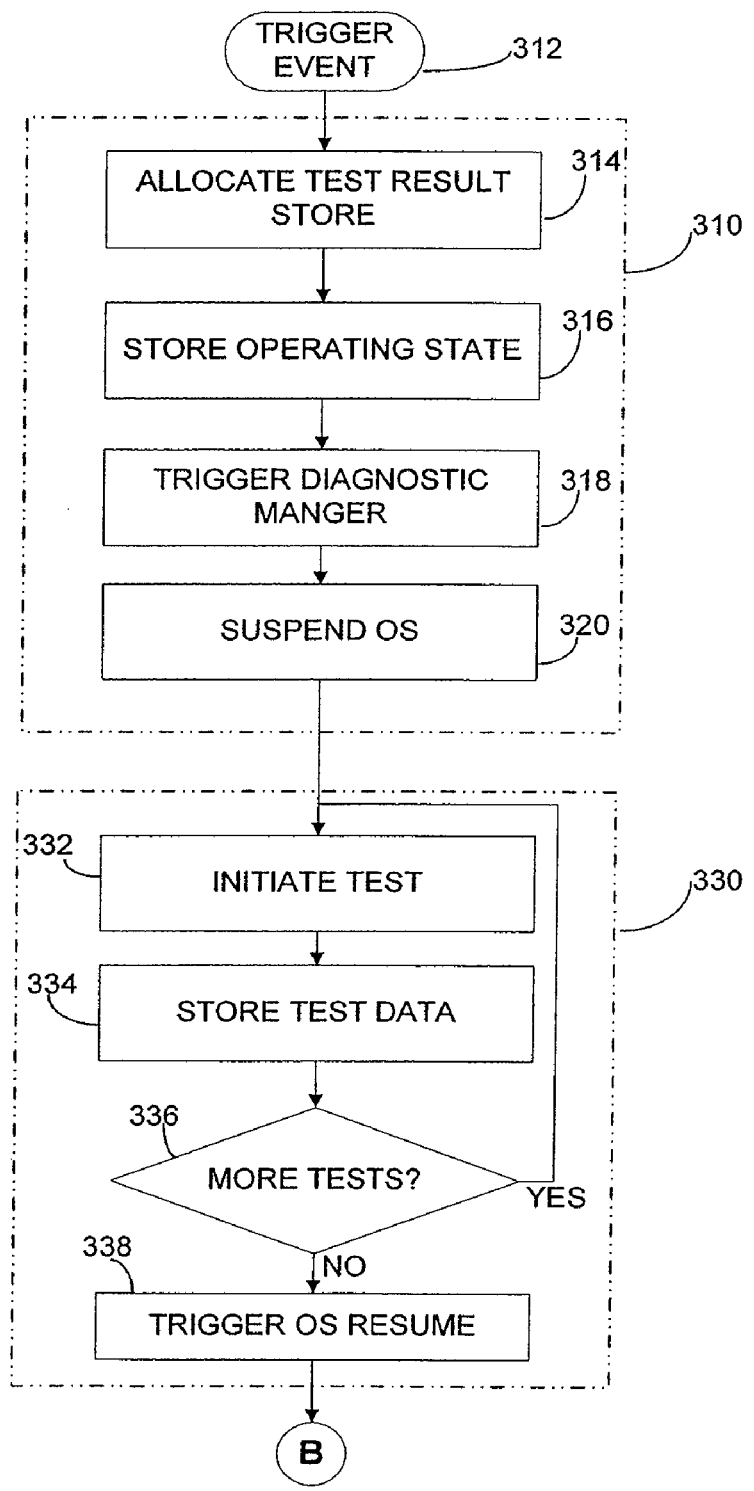
FIGS. 3A and 3B are a flowchart of a process of performing diagnostic functions on a computer according to embodiments of the invention.
Figure 3B:
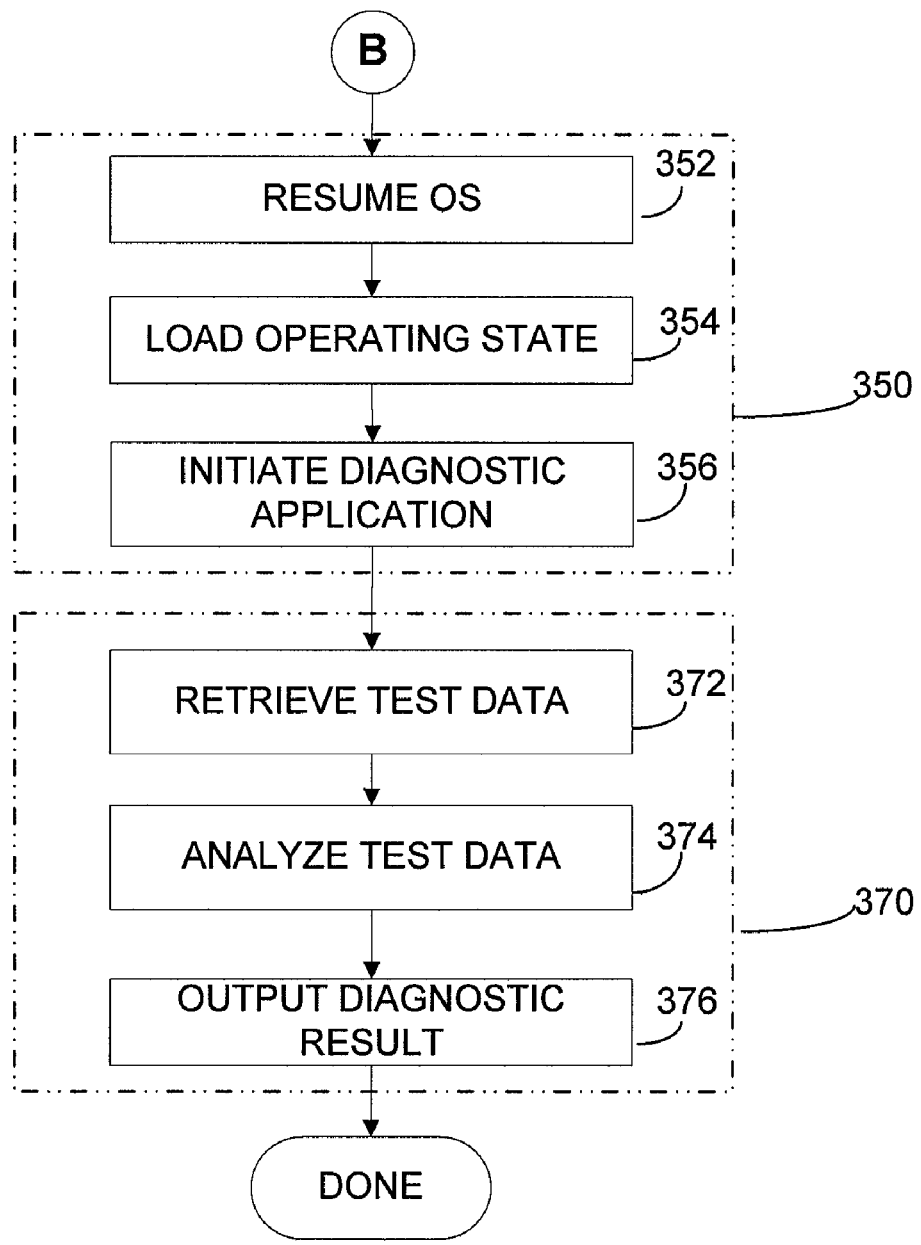

FIG. 3A and FIG. 3B illustrate a process by which computer 100 may take advantage of this flexibility. The process in FIG. 3A begins with a trigger event 312. Trigger event 312 may be detection of an error, scheduling information, policy information or an activity level indication for user input as illustrated in FIG. 2. However, any suitable event may serve as a trigger for diagnostic functions.

Regardless of the nature of trigger event 312, a subprocess 310 may begin in response to that event. In subprocess 310, execution within operating system environment 200 is suspended. In the example illustrated in FIG. 3A, the process of suspending the operating system environment begins at block 314. At block 314, computer storage for test results is allocated. As described above in connection with FIG. 2, memory may be allocated in a location that does not interfere with the storage and retrieval of state information by operating system 210. The memory may be allocated dynamically, for example, by a memory management component within operating system 210. Alternatively, memory for storing test results may be allocated at the time computer 100 is constructed or configured by creating memory locations used specifically for storage of diagnostic test results.

Regardless of how the storage is allocated at block 314, subprocess 310 continues to block 316 where the operating state of computer 100 within operating system environment 200 is stored. Once the operating state is stored, execution of a diagnostic manager may be triggered at block 318. Any suitable mechanism may be employed for triggering execution of a diagnostic manager. In some embodiments, processing at block 318 may entail providing parameters of operation to the diagnostic manager. Thereafter, the operating system is suspended at block 320.

After execution of the operating system is suspended, a diagnostic subprocess 330 may begin. In the embodiment illustrated in FIG. 2, diagnostic subprocess 330 is performed under control of a diagnostic manager 260. However, any suitable mechanism for controlling processing within diagnostic subprocess 330 may be used.

Regardless of how the processing is controlled, subprocess 330 may begin at block 332 where a test is initiated. Processing at block 332 may be performed by executing a diagnostic routine or other components within a diagnostic environment. Such processing may entail access to hardware components of the computer being tested. This access may include manipulating the hardware in ways that would interfere with components in an operating system environment, if the operating system environment were not suspended. For example, testing at block 332 may entail a memory test. Changing the contents of memory used by the operating may cause an error in execution of a software component within the operating system environment. For example, an error may be introduced in an application component if memory used by that application component to store data is modified. Likewise, modifying memory may cause an error in an operating system component, such as a memory manager. However, because any needed state information of any application or operating system components will be restored when execution of the operating system environment is restored, any changes to the memory will not impact operation of those components.

Alternatively, testing at block 332 could cause the hardware to perform in ways that would trigger unintended operations within the operating system environment if the operating system environment were not suspended. For example, testing at block 332 may cause hardware to generate an interrupt. Because an operating system may be programmed to respond to hardware interrupts, testing at block 332, if it triggered a hardware interrupt, may cause the operating system, were it not suspended, to perform erratically. Thus, such testing, which would either interfere with the operating system or cause the operating system to behave in an unintended fashion, can be performed at block 332 without such negative results.

Regardless of the specific types of test performed at block 332, the process may continue to block 334. At block 334, the test results generated during processing at block 332 may be stored. The test results may be stored in the memory allocated at block 314 or stored in any other suitable way.

Once processing is completed on one test, the processing continues to decision block 336. At decision block 336, the process branches depending on whether further tests are desired. Any suitable mechanism may be used to determine whether further tests are desired. In some embodiments, a diagnostic manager may be programmed to execute a predetermined number of tests. Alternatively, the diagnostic manager may be programmed to execute all test modules present in the diagnostic environment. In other embodiments, the diagnostic manager may receive input parameters specifying tests to be performed. Regardless of how the tests are specified, if further tests remain, processing branches from decision block 336 to loop back to block 332 where a further test is performed. The processing continues in this fashion until all tests are performed. Thereafter, the processing branches from decision block 336 to block 338. At block 338, the operating system is triggered to resume.

Once the operating system is triggered to resume, a subprocess 350 is performed. During subprocess 350, the operating system environment is restored and execution of the operating system and other applications that were running in the operating system environment at the time it was suspended are resumed.

Subprocess 350 begins with processing at block 352. At block 352, execution of the operating system is resumed. At block 354, the operating state stored at block 316 is loaded. Loading the operating state may involve configuring hardware components or software components to restore the state of those components at the time execution within the operating system environment was suspended.

Subprocess 350 may also include resuming applications that were executing at the time the operating system environment was suspended. Alternatively, subprocess 350 may include launching an application adapted to run following execution of diagnostic functions. In the example of FIG. 3B, subprocess 350 continues with processing at block 356 where a diagnostic application may be launched. Subprocess 370 may then be performed under control of the diagnostic application.

Subprocess 370 begins with processing at block 372. At block 372, test data is retrieved. In the embodiment illustrated in FIGS. 3A and 3B, the test data retrieved at block 372 may include all or a portion of the test data stored at block 334.

The test data retrieved at block 372 may be analyzed at block 374 by the diagnostic application. Any suitable analysis may be performed at block 374. For example, test data may be examined to determine whether the data reveals a failure in a hardware component. Alternatively, analysis at block 374 may reveal degraded performance of a component. As another example, analysis at block 374 may include storing test results each time diagnostic functions are performed. As subsequent diagnostic functions are performed, analysis may include comparison of current test data with previously gathered and analyzed test data. Consequently, the analysis at block 374 may include trend analysis or failure prediction analysis. However, the specific analysis performed at block 374 is not critical to the invention.

Once the analysis is completed at block 374, subprocess 370 continues to block 376. At block 376, a diagnostic result may be output. The diagnostic result may be output in any suitable format to any suitable device. For example, diagnostic result may be output on a computer display in a format useful to a user of a computer on which the diagnostic process executes. The result may indicate to the user that a hardware failure has occurred or that hardware components of the computer are operating properly. Alternatively, the output at block 376 may include providing diagnostic results to other software components. For example, the diagnostic results may be communicated to a server where diagnostic results for multiple computers may be aggregated. Such an aggregation function may be useful in an enterprise setting where a network administrator can use information about computers within the enterprise to detect failure trends, for capacity planning, to schedule maintenance or for any other purpose. Accordingly, any number of suitable output operations may be employed at block 376 and the invention is not limited by the specific output mechanism used.

Following output of the diagnostic result at block 376, the process illustrated in FIGS. 3A and 3B ends. However, the process may repeat. For example, the process of FIGS. 3A and 3B may be repeated at periodic intervals. Alternatively, the process may repeat in response to defined conditions. In response to user input, or in response to any other suitable trigger.

Having thus described several aspects of at least one embodiment of this invention, it is to be appreciated that various alterations, modifications, and improvements will readily occur to those skilled in the art.

For example, diagnostic modules were described to be software stored in memory on the computer being tested. However, the modules could be accessed over a network or obtained in other suitable way.

As another example, diagnostic manager 260 is shown separate from operating system 210. However, diagnostic manager 260 could be a component of an operating system, though operating in a diagnostic mode. In a diagnostic mode, for example, the diagnostic manager 260 and/or diagnostic modules 262A . . . 262C could use kernel mode components of the operating system. In such a mode, normal operating system processing may be suspended and some drivers may be disabled, but diagnostic functions of the operating system kernel may be available.

Also, the diagnostic modules were described to interface with a diagnostic manager component. Such an environment allows diagnostic modules to be easily added or removed without changing the overall control or data flow of the diagnostic operations. However, in some embodiments, it may be desirable to have a single diagnostic component or to have control and data flows other than as illustrated. For example, each diagnostic module may store diagnostic data in directly into a diagnostic data store, rather than providing diagnostic data to a diagnostic manager component.

Also, examples of diagnostic functions were given in which the diagnostic functions accessed the state of the computer. Any type of diagnostic functions may be performed. For example, diagnostic functions supporting periodic maintenance may alternatively be performed.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of testing a computer having an operating system, the method comprising:
   joining the computer to a computer network and receiving over the computer network policy information, the policy information identifying at least one diagnostic test to be run with the operating system suspended and at least one set of conditions each corresponding to at least one corresponding diagnostic test, wherein upon satisfaction of a first set of conditions at least one first corresponding diagnostic test is to be carried out;
   upon detecting satisfaction of a first set of conditions:
      suspending execution of the operating system;
      while the operating system is suspended, executing a diagnostic routine to obtain test data;
      storing the test data;
      resuming execution of the operating system; and
      with a program executing with the operating system, generating a diagnostic result based on the stored test data.

2. The method of claim 1, wherein suspending execution of the operating system comprises storing a state of the computer.

3. The method of claim 2, wherein resuming execution of the operating system comprises loading the stored state of the computer.

4. The method of claim 1, wherein executing the diagnostic routine comprises executing a diagnostic routine adapted for execution using kernel mode operating system components with normal operating system processing suspended.

5. The method of claim 4, wherein executing the diagnostic routine with the operating system suspended comprises executing the diagnostic routine in a BIOS environment.

6. The method of claim 4, wherein executing the diagnostic routine with the operating system suspended comprises executing a diagnostic routine that tests a hardware component of the computer.

7. The method of claim 1, wherein executing the diagnostic routine comprises executing a diagnostic routine to test computer-readable memory, the computer-readable memory being memory that is accessed by the operating system when the operating system is executing.

8. The method of claim 1, wherein executing the diagnostic routine comprises causing a hardware interrupt, the hardware interrupt being an interrupt to which the operating system is adapted to respond when the operating system is executing.

9. The method of claim 1, wherein joining the computer to a computer network comprises joining the computer to a domain of a managed computer network, and
wherein receiving the policy information comprises receiving the policy information from a domain controller of the domain, the policy information having been specified by an administrator of the domain.

10. The method of claim 1, wherein detecting satisfaction of the first set of conditions comprises detecting that a time specified by the policy information has been reached.

11. The method of claim 1, wherein detecting satisfaction of the first set of conditions comprises detecting that an event has occurred.

12. A computer-readable storage medium, comprising:
a store;
computer-executable components for execution on a computer, the components comprising:
an operating system comprising a memory manager to allocate memory space in the store and manage allocated memory space in the store;
a hardware interface component separate from the operating system;
at least one diagnostic component adapted to interact with the hardware interface component to perform at least one test of the computer, the diagnostic component generating test data, and the at least one diagnostic component further being adapted to place the test data in the store; and
a triggering component to signal the operating system to suspend and to signal the at least one diagnostic computer to perform the at least one test of the computer when the operating system is suspended,
wherein the memory manager is adapted to, when the operating system receives a signal to suspend, allocate previously-unallocated memory space of the store as a diagnostic store and instruct the at least one diagnostic component to store the test data in the diagnostic store.

13. The computer-readable storage medium of claim 12, wherein the at least one diagnostic component comprises a diagnostic manager and a plurality of diagnostic modules, each being adapted to perform at least one test on the computer.

14. The computer-readable storage medium of claim 12, wherein, when the operating system receives the signal to suspend, the memory manager allocates previously-unallocated memory space of the store as an operating system state store, the memory space of the operating system state store being different from the memory space of the diagnostic store, and
wherein the operating system, during a suspend process, stores state information relating to operation of the computer within an operating system environment in the operating system state store.

15. The computer-readable storage medium of claim 12, wherein the computer-executable components further comprise a diagnostic application adapted to access test data in the diagnostic store, analyze the test data and output a diagnostic result.

16. The computer-readable storage medium of claim 15, wherein the diagnostic application is further adapted to execute within an environment established by the operating system.

17. The computer-readable storage medium of claim 12, wherein the hardware interface component comprises a Basic Input Output System (BIOS) and the operating system, when executing, interacts with the BIOS.

18. A method of testing a computer having an operating system, the method comprising:
in response to a test trigger, storing state information relating to execution of the computer, the state information being stored in a first location;
suspending execution of the operating system and configuring the computer with a test environment that does not run on the operating system;
while the operating system is suspended, executing a diagnostic routine in the test environment to generate test data, the diagnostic routine performing at least one interaction with hardware of the computer that would cause an error in the operating system if the operating system were executing;
storing the test data in a second location;
following the executing of the diagnostic routine, resuming execution of the operating system by configuring the computer with the stored state information; and
accessing the test data with an application executing while the operating system is executing.

19. The method of claim 18, wherein performing the at least one interaction comprises changing data stored in a memory of the computer, the memory having been allocated and managed by a memory manager of the operating system.

20. The method of claim 18, wherein performing the at least one interaction comprises attempting to generate, with the hardware, signals that the operating system is configured to interpret as hardware interrupts.

* * * * *